United States Patent [19]

Wong et al.

[11] 4,065,417

[45] Dec. 27, 1977

[54] REVERSIBLE SHEAR THINNING GEL FORMING COATING COMPOSITION FOR GLASS FIBERS

[75] Inventors: Robert Wong, Granville; Homer G. Hill, Newark, both of Ohio

[73] Assignee: Owens-Corning Fiberglas Corporation, Toledo, Ohio

[21] Appl. No.: 593,601

[22] Filed: July 7, 1975

Related U.S. Application Data

[60] Continuation of Ser. No. 871,098, Oct. 9, 1969, abandoned, which is a division of Ser. No. 762,435, Sept. 25, 1968, Pat. No. 3,533,768, which is a continuation-in-part of Ser. No. 573,870, Aug. 22, 1966, abandoned.

[51] Int. Cl.² .................... C08L 1/00; C08L 31/04; C08L 63/02; C08L 77/00
[52] U.S. Cl. .................... 260/17.4 CL; 106/163 R; 106/203; 106/210; 106/213; 252/316; 252/317; 260/17 R; 260/18 EP; 260/18 N; 260/29.2 EP; 260/29.2 N; 260/29.3; 260/29.6 R; 260/29.6 ME; 260/29.6 NR; 260/29.6 WA; 260/29.6 F; 260/29.6 BE; 260/31.2 R; 260/31.4 R; 260/32.8 R; 260/33.4 R; 260/33.6 UA; 260/47 EP; 260/75 T; 260/830 R; 260/830 TW
[58] Field of Search ............ 260/861, 862, 869, 860, 260/29.6 NR, 31.4 R, 32.8 R, 33.4 R, 33.6 UA, 17.4 CL, 17 R

[56] References Cited

U.S. PATENT DOCUMENTS 3,200,085  8/1965  Guglielmo ............ 252/478
3,405,087  10/1968  Fryd ...................... 260/861
3,438,903  4/1969  Prahl ..................... 252/478
3,463,749  8/1969  Taft ....................... 260/861

*Primary Examiner*—Harold D. Anderson
*Attorney, Agent, or Firm*—Philip R. Cloutier

[57] ABSTRACT

An improved method of coating fibers and particularly glass fibers with a solution of materials containing a reversible shear thinning gel producing agent which causes the coating to be transformed into a shear thinning gel under predetermined conditions. The predetermined conditions may be brought about after the coated fibers are brought together into touching engagement in a package, or may be caused to occur before the coated fibers are brought together in touching engagement in the package. The fibers can be removed from the package and still retain a coating on the fibers, since the shearing action of the fibers through the gel converts the gel to a liquid which adheres to the fibers as they are being pulled through the gel. The predetermined conditions may involve a change in temperature, or a change in concentration of solids. The change in temperature will usually be a cooling of the coating materials to a temperature below the gelation point, and the change in concentration will usually be an evaporation of solvent to form at least a skin of gel on the surface of the coating materials. The change in temperature technique can be used to increase the amount of solids that is applied to the fibers. The uncoated fibers, however, are preferably drawn through the gel to subject the reversible shear thinning gel to shear which causes the materials to flow around and adhere to the fibers, following which the coating reverts to a gel.

7 Claims, 6 Drawing Figures

REVERSIBLE SHEAR THINNING GEL FORMING COATING COMPOSITION FOR GLASS FIBERS

CROSS REFERENCES TO RELATED APPLICATIONS

This is a continuation of Application Ser. No. 871,098, filed Oct. 9, 1969, now abandoned, which is a division of Application Ser. No. 762,435, filed Sept. 25, 1968, now U.S. Pat. No. 3,533,768, which is a continuation-in-part of Application Ser. No. 573,870, filed Aug. 22, 1966, now abandoned.

BACKGROUND OF THE INVENTION

The present invention relates to a new and improved method for coating fibers, and particularly glass fibers at forming; and to the fibers coated thereby.

The technology which has been developed for the production of glass fibers, presently makes possible the production of fibers having a diameter of from approximately 0.0001 inch to approximately 0.0004 inch, at a rate of from approximately 10,000 feet per minute to approximately 15,000 feet per minute. Glass fibers are produced from small streams of molten glass which exude through tiny orifices located in what is called a bushing. Conventionally, bushings have 204 such orifices. The tiny streams of molten glass which issue from the bushing are attenuated by pulling the fibers until the diameters given above result, and during which time the streams cool and rigidify into what are called filaments. These filaments are then coated with a protective film for the purpose of preventing glass to glass abrasion, and following which they are brought together to form a strand. This strand is coiled upon a spool to form a package. During formation of the package, the strand is traversed back and forth across the spool by a device which is called a traverse, and which is located between the point where the coating materials are applied, and the rotating spool on which the package is made. The spool is rotated by what is called a winding drum, and the pulling action supplied by the winding drum attenuates the molten streams of glass, pulls the filaments past the coating applicator, and through the traverse, and coils the strand onto the package. The winding drum is usually located approximately 10 feet from the bushing, so that the entire forming operation is carried out in a fraction of a second.

The problem of abrasion of glass upon glass is a serious one and has generally been a controlling factor in the rate at which this technology has developed. The seriousness of the problem has caused the wide spread theory that glass to glass abrasion can only be prevented by a solid film of material between the filaments to at all times assure physical separation of the filaments. Regardless of the validity of this theory its acceptance by the art has not caused the art to develop a coating which is completely satisfactory under all conditions for use in separating the filaments during forming. Where the strands are to be woven into textiles, it will be apparent that the amount of film forming materials which can be used must be held within certain percentages of the total weight of the strand in order that the strand will not be unduly stiff. Dyes will not color the glass itself, and so the coatings which are used must either be capable of being dyed, or must be capable of being removed, and later replaced by a material capable of being dyed. Where the glass is to be used for reinforcing plastic materials, the bond between the coatings and the glass filaments is very important, as well as the compatibility of the coating with the later applied resin which the coated strand is intended to reinforce.

The technology in its forty some years of existence has examined all types of materials for their suitability as coatings on glass fibers in an attempt to find one which is "universal" in that fibers coated therewith can be used for all known subsequent uses of coated glass strand. The art has tried all kinds of resins, either as emulsions, or as solutions is organic solvents, but all lack some desired characteristics, and usually suffer from high tensions during weaving operations. In addition, organic solvents create explosion hazards. Explosion hazards require expensive equipment to overcome. In general, resins and other materials requiring organic solvents have not been better than coating materials which are soluble in aqueous media, so that the art has substantially universally used coating materials soluble in water. By and large, the most commonly used coating materials for protecting glass fibers during the forming operation comprise starch in some form. Although starch is not durable to the degree that it can stay in place on the filaments and provide protection after the fibers are woven, it has been without equal in its protection of the strands during the various abrasion producing operations that are involved preparatory to, and during, weaving. In addition, methods have been developed, usually burning, which are quite satisfactory for removing the starch after weaving, so that any desired finish coatings can then be applied. The art has long desired to replace starch base coatings, which are only temporary in nature, with a single coating material which would perform as satisfactory as starch base materials during forming, and which would also act as a finish size which is capable of being dyed and which will permanently protect the filaments during use. The art would further like this coating material to be a "universal" one, so that it can be used regardless of the end use of the strand. Such a universal coating material for glass fibers has never been developed, and there is considerable belief in the art that one will never be developed, because of the great number of properties which such a material must have.

Coating materials, including starch base coating materials, must be quite fluid when applied to the filaments, in order that the coating materials will completely cover, or "wet out" the filaments in the short length of time that exists before they are brought together into a strand. The amount of "solids" that can be applied to the filaments, therefore, is limited by the degree of fluidity necessary to "wet out" the filaments. It is not possible to apply fluid coating materials in an amount which will completely "wet out" the strands without having an excess present, and a high percentage of the coating fluids brought in contact with the filaments is thrown into the surrounding area as a spray. In addition, the coating collects at different areas of the applicator and winding equipment which then either drips or is thrown to the floor. In all prior art processes with which applicants are aware, the degree of fluidity required necessitates that the coating fluids have only a small percentage of solids, and a high percentage of the coating materials that are carried with the strand into the coiled package is the solvent. The coiled packages of strand which are produced must be dried prior to subsequent twisting and weaving operations, and during this drying operation, the movement of the fluid or solvent migrates to the surface of the package and carries along with it some of the solid materials which form the coating. This movement of the solid materials with the solvent is commonly called "migration." The art has long been concerned with the problem of migration and a considerable number of patents have been concerned solely with this single problem.

According to the concept of the present invention, a new and improved method of applying coating materials to fibers, and particularly glass fibers at forming, is provided which will allow the various already developed coating materials to be applied to the fibers in a manner which overcomes some of the problems which the prior art has tried to overcome by specially developed coating materials.

Accordingly, it is an object of the present invention to provide a new and improved method of applying coating materials to glass fibers at forming which substantially eliminates the spray and other types of loss of the coating material to the surrounding area.

Another object of the invention is the provision of a new and improved method of applying coatings to fibers which will allow a greater "concentration" of solids to be applied to the fibers.

Another object of the invention is the provision of a new and improved method of applying coatings to glass fibers at forming which substantially completely overcomes the problem of "migration."

A further object of the invention is the provision of a new and improved method of coating glass fibers, and particularly glass fibers at forming, wherein the coating material is either a reversible shear thinning gel, or is contained within a reversible shear thinning gel, and the coating material is caused to flow around the fibers as a liquid and then revert to a gel.

Further objects and advantages of the invention will become apparent to those skilled in the art to which it relates from the following description of the method of the present invention, as well as numerous examples of materials which can be applied to the fibers according to the method of the invention.

SUMMARY OF THE INVENTION

According to the invention, a reversible shear thinning gel producing agent is incorporated in the lubricating or film forming solutions that are applied to fibers, and particularly glass fibers, to produce a coating which forms a reversible shear thinning gel under predetermined conditions. The shear thinning coating materials can be applied to the fibers either from a gel or from a solution, and the coated fibers subjected to the predetermined conditions which causes the coating to revert to the gelatinous state. The fibers coated with the solutions can be brought into touching engagement and then coverted into the gelatinous state, or the coatings can be converted into a gel prior to the time that they are brought into touching engagement with other fibers. It has been found that even though the fibers are embedded in a shear thinning gel in the package, they can be removed from the package without being ripped free of the gel. The shearing action of the fiber through the gel causes the gel to revert to a fluid which adheres to the fibers and reforms into a gel when the fibers are clear of the package. In addition, the gelatinous state reduces migration of the film forming materials and other constituents during evaporation of the solvent forming the coating solution.

Another advantage of the present invention is achieved by causing the coating solutions to be transformed into a gel around the fibers prior to being brought together into the package. The gelatinous state helps to hold the material onto the fiber to prevent the materials from being thrown from the fibers even though the fibers travel at very high speeds. In addition, greater amounts of the coating materials can be caused to adhere to the fibers. It is not necessary in all instances to convert all of the coating solution into the form of a gel since a definite advantage is achieved when only a surface of the coating solution is transformed into a gel. This skin of gel forms a type of shell which accomplishes some of the same advantages that are achieved when all of the solution is transformed into a gel. A skin of gel can be obtained by the evaporation of solvent to increase the concentration of solids in the surface layer of the coating to a degree where the surface layer is transformed into a gel.

In still other instances, the principles of the present invention can be achieved by applying the coating solutions to the fibers under thermal conditions in which the material is a liquid, and by thereafter subjecting the coated fibers to thermal conditions which causes the solution to revert to a shear thinning gel. In one convenient method of operation, the coating solutions can be applied to the fibers hot, and after the hot solution surrounds the fibers, the coated fibers are subjected to a temperature below the gelation point to cause the coating to revert to a gel. This method of operation has the big advantage in that coating solutions of high solid content can be caused to flow around the fibers to coat the fibers, following which the material is locked onto the fibers by the reversion of the material to the gelatinous state. It is therefore possible to produce coatings of sufficient solids content to fill the voids between packed fibers without the further impregnation of the packed fibers by additional solids. This has particular advantages where the coatings are resinous in that fiber reinforced resins can be produced without a later impregnation step.

The fibers can also be coated by drawing the uncoated fibers through a body of reversible shear thinning gel to subject the gel to shear and thereby cause the gel to revert to a liquid which flows around the fibers. The liquid coating then reverts back to a gel when the fibers have moved clear of the body of gel. By causing the coating materials to revert to a gel immediately after coating, spray or throw off of the coating material from the fibers is substantially eliminated, and the contamination of the surrounding area with the coating materials is substantially eliminated. The advantages of having the coating materials present on fibers in the form of a shear thinning gel are numerous, and various other advantages and modifications or techniques for producing the same, will occur to those skilled in the art to which the invention relates.

DESCRIPTION OF THE PREFERRED EMBODIMENTS

Figure 1:
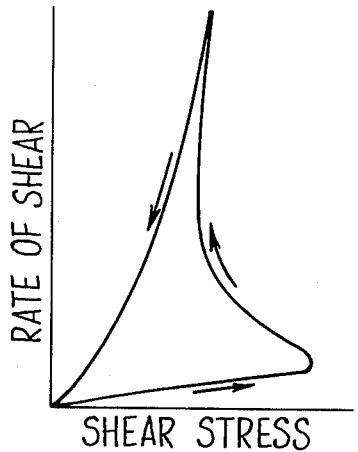
FIG. 1 is a graph of viscosity versus shear rate of one embodiment of coating material which has a pronounced point of transition from the gelatinous state to the liquidous state.
Figure 2:
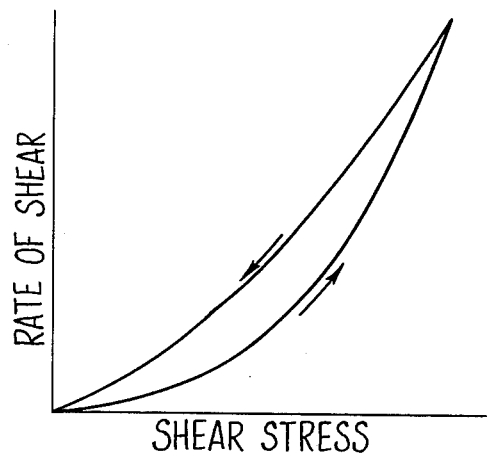
FIG. 2 is a graph similar to FIG. 1 showing another shear thinning coating material wherein the transition state is more gradual.
Figure 3:
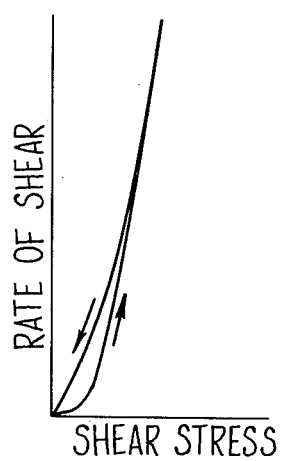
FIG. 3 is another graph similar to FIG. 1, but showing the thixotropic nature of a thin solution.
Figure 4:
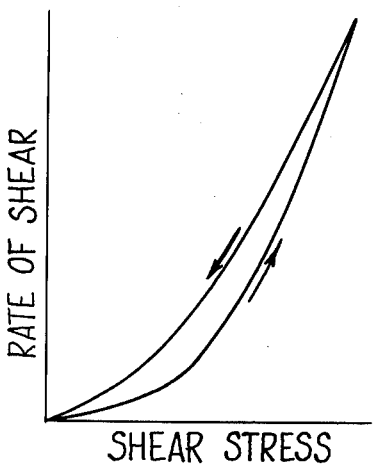
FIG. 4 is a graph of the same type of solution as used for FIG. 3 excepting that it is of a high solids content.
Figure 5:
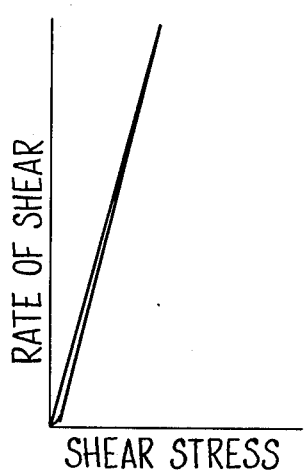
FIG. 5 is a graph similar to FIG. 1 showing the change in viscosity of a coating material having high solids content when at a temperature above the gelatinous point.
Figure 6:
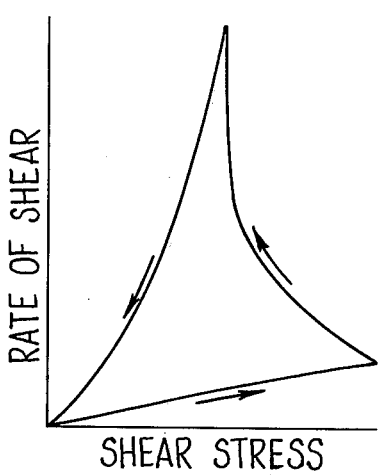
FIG. 6 is a graph similar to FIG. 5, but showing viscosity change at a temperature below the temperature of gelation.

In one form of the invention, the filaments or fibers are drawn over a reversible shear thinning material which is broken down into a solution to flow around the fibers by reason of the shear produced as the fibers are drawn through the material, and which solution thereafter reverts to a thickened or gelatinous state immediately after being removed from the shear producing forces. According to the invention, it has been found that fibers drawn over a surface coated with a reversible shear thinning gel will produce a shearing action in the film of gel which will cause the fibers to be completely and uniformly coated with the material. The degree of uniformity of the coating so produced in unexpected since fibers cannot be drawn over conventional gels to coat the fibers. Conventional gels resist transfer from the body of gel to the fibers, and generally do not adhere to the back side of the fibers. That portion of conventional gels which is picked up by fibers drawn there over is retained on the fibers more by mechanical action than by adhesion. It has been discovered that reversible shear thinning gels do more than coat the surface that is brought to bear upon the gel, in that the shear thinning materials flow to the back side of the fibers where they adhere equally well. The coatings produced by drawing the fibers over shear thinning gels are satisfactory and uniform, at least to a degree where the fibers coated therewith will prevent glass to glass abrasion throughout all forming, twisting, and weaving operations which glass fibers are subjected to.

Numerous materials are known to produce reversible shear thinning gels. It has been found that substantially any of these materials can be used to make a gel of any of the previously used coating materials for fibers. Not only are fibers drawn over these gels adequately coated, but substantially none of the gel is lost in the process. The coating operation using reversible shear thinning gels, therefore, is extremely efficient, and makes possible the economic use of materials which were formerly thought to be too costly for use as a coating on glass fibers. It has also been found that shear thinning gels containing a considerably higher percent of solids than the prior art coating solutions, emulsions, or suspensions, can be satisfactorily applied to the fibers. The process of the present invention wherein the fibers are drawn over reversible shear thinning materials to transfer material from the applicator to the surface of the fiber has so many advantages that it well may make all prior methods of applying materials to glass fibers at forming obsolete. The possibility that reversible shear thinning gels could be used to uniformly coat the fibers could not be foreseen, nor could the many advantages of the method of the present invention be predicted.

A considerable number of materials, both organic and inorganic, are known to produce reversible shear thinning gels, and these materials are broadly called thixotropes. The precise structure of gels generally, and shear thinning gels in particular, has not been clearly established, but it is postulated that they form a network by means of secondary bonds which will surround and enclose other materials including solvents. In some instances the solvents, if they are polar, will join in the network by means of Van der Waal bonds to cross link from one particle of gel former to another. In other cases, it is believed that the particles of the gel former align through secondary forces to form the network. In a shear thinning gel, shear forces disrupt the secondary bonds to break down the structure and cause it to behave in a manner similar to a solution. As soon as the shear forces are removed, however, the materials align themselves into a network again which encloses the solvent and causes the composition to assume a gelatinous state. As previously indicated, shear thinning gels can be made in both aqueous and organic solvent media to produce shear thinning gels of slightly different structures. All types of shear thinning gels regardless of the media, can be used to adequately coat fibers, and particularly glass fibers at forming. Since all types of reversible shear thinning gel producing materials are by dictionary definition called thixotropes, and since all known thixotropes have been found to produce gels suitable for coating glass fibers at forming, these materials have been referred to in the parent specification and claims as thixotropes or thixotropic agents. Recent technical literature, however, seems to limit use of the word thixotropic to refer to systems which exhibit a sudden drop in viscosity accompanied by a breaking of the gel structure. The word pseudoplastic has been used to refer to a gradual changing or thinning of the gel structure to the viscosity characteristic of a liquid. Both pseudoplastic and thixotropic materials fall within the broad dictionary definition of thixotropic as used heretofore. Similarly, the word gel is used in a broad sense to connote the gel forming mechanism rather than the provision of any specific degree of rigidity.

The following is an example of an organic thixotrope which makes a suitable thixotropic gel with an organic solvent suitable for application to glass fibers at forming.

EXAMPLE 1

|  | Parts by Weight |
| --- | --- |
| Diacetone alcohol | 170 |
| Polyvinyl acetate | 20 |
| *Thixcin R | 10 |

*Thixcin R is a trade name of an organic thixotrope sold by the Baker Castor Oil Company, it is a high melting (ca 85° C) ester of castor oil.

This material was prepared by mixing the polyvinyl acetate in a hundred parts of diacetone alcohol until the polyvinyl acetate was solubilized, following which the remainder of the diacetone alcohol was added. This material was put in a Waring blender, and the Thixcin R added with the Waring blender run at a high speed, and with the temperature of the material at approximately 110° F. A very good thixotropic gel is produced which can be pumped to a rounded surface over which glass fibers are pulled as at forming. The fibers so coated emerge with a film of thixotropic gel completely coating the fibers which upon evaporation of the solvent, leaves a film of the polyvinyl acetate completely coating the fibers.

The following example illustrates that resins and other materials can be incorporated with the thixotrope to produce a gel of the resins.

EXAMPLE 2

| | Parts by Weight |
|---|---|
| Expoxy (1) | 20 |
| Epoxy (2) (70% solids) | 8.6 |
| (R—C—NH₃) + —(OOCCH₃) where R = 8-18 C's | 1.5 |
| Gamma amino propyl tri- ethoxy silane | 0.7 |
| Diacetone alcohol | 159.2 |
| Thixcin R | 10 |

Epoxy 1 has the following formula:

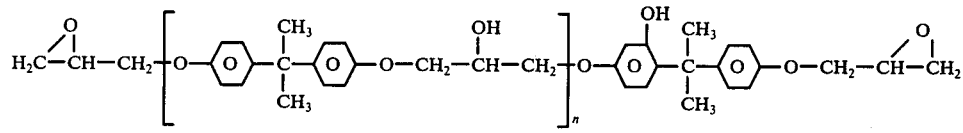

Wherein $n=0$.

Epoxy 2 has the same formula excepting $n=3$.

This material was prepared by mixing the epoxide polymer with the diacetone alcohol in a Waring blender to form a solution, and thereafter adding the Thixcin R. The blender was run at high speed for five minutes, at a temperature of approximately 112° F., and the material prepared was a good thixotropic gel which completely surrounds glass fibers when pulled therethrough. Upon evaporation of the solvent, an epoxide resinous coating remains on the fibers.

The following examples illustrate that substantially any resinous material can be made into a thixotropic gel. These materials were prepared in generally the same manner described above, and they all uniformly coat glass fibers to leave a generally uniform film of the resin which completely surrounds and coats the fibers.

EXAMPLE 3

| | Parts by Weight |
|---|---|
| Butyl Cellosolve Stearate | 190 |
| Thixcin R | 10 |

EXAMPLE 4

Water soluble epoxy resin

| | |
|---|---|
| Water soluble epoxy resin | 50 |
| Diacetone alcohol | 142 |
| Thixcin R | 8 |

EXAMPLE 5

| | |
|---|---|
| Octodecylamine | 15 |
| Isopropanol | 100 |
| Thixcin R | 12 |
| 5% Aqueous polyvinyl alcohol solution | 100 |

EXAMPLE 6

| | |
|---|---|
| Epoxide (1) | 30 |
| Gamma amino propyl triethoxy silane | 1 |
| Butyl cellosolve stearate | 80.5 |
| Diacetone alcohol | 80.5 |
| Thixcin R | 8 |

EXAMPLE 7

| | Parts by Weight |
|---|---|
| Archer Daniels aeroflint 303-X-90 (Oxirane modified ester, xylol solution 90% solids) | 40 |
| Archer Daniels aeroflint 202-XA1-60 (Polyester Xylol MIBk solution 60% solids) | 40 |
| White mineral oil - a highly refined, completely saturated petroleum oil | 10 |
| Cellosolve acetate | 110 |
| Thixcin R | 8 |

EXAMPLE 8

| | |
|---|---|
| Epoxy (2) | 17.12 |
| Epoxy (1) | 7.88 |
| Glycidoxy trimethoxy silane | 1.17 |
| Silicone lubricant | 1.06 |
| Diacetone alcohol | 100 |
| Thixcin R | 3 |

EXAMPLE 9

| | |
|---|---|
| Acrylic resin (Rohn & Haas acryloid A10 30% solids) | 10 |
| Thixcin R | 4 |
| Cellosolve Acetate | 86 |

The following is an example of another organic thixotrope which forms thixotropic gels in organic media suitable for application to glass fibers.

EXAMPLE 10

| | Parts by Weight |
|---|---|
| Diacetone alcohol | 76 |
| *Monazoline (1-hydroxyethyl, 2-alkylimidazoline wherein the alkyl radical is a $C_{17}$ unsaturated chain) | 4 |
| Refined attapulgite (3 MnO . 1.5 $Al_2O_3$ . 8 $SiO_2$ . 9 $H_2O$) | 20 |
| $H_3PO_4$ | 0.5 |

*The Monazoline has the following formula:

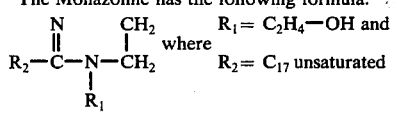

where $R_1 = C_2H_4-OH$ and $R_2 = C_{17}$ unsaturated

The gel was prepared by dissolving the Monazoline in the diacetone alcohol and then adding the thixotrope. The material was mixed in a Waring blender for 5 minutes. Thereafter, the phosphoric acid was added and thoroughly mixed to produce the thixotropic gel. This material uniformly costs glass fibers drawn therethrough.

The next example illustrates that resins and other materials can be incorporated into a thixotropic gel using the same thixotrope.

EXAMPLE 11

| | Parts by Weight |
|---|---|
| Epoxide resin (1) | 7.6 |
| Epoxide resin (2) (70% solids) | 3.3 |
| Gamma amino propyl triethoxy silane | 0.3 |
| Diacetone alcohol | 64.2 |
| Monazoline | 4 |
| Refined attapulgite (3 MgO . 1.5 $Al_2O_3$ . 8 $SiO_2$ . 9 $H_2O$) | 20 |
| $H_3PO_4$ | 0.4 |

This material was prepared in the same manner given above, and likewise uniformly coats glass fibers, to in this case leave a uniform coating comprising the epoxide and other ingredients.

The following is an example of an inorganic material which forms a thixotropic gel in an aqueous media. This gel likewise uniformly coats glass fibers when drawn therethrough.

EXAMPLE 12

| | Parts by Weight |
|---|---|
| Baymal Alumina | 2.8 |
| $NH_4OH$ | 0.5 |
| Water | 70 |

This material is prepared by dispersing the Baymal in 50 parts of water. The ammonium hydroxide is added to 20 parts of water and the two materials are mixed in a Waring blender for ten minutes. The material produced is a thixotropic gel. Other materials, such as cationic and nonionic lubricants and film formers, such as starch or other film formers, can be added thereto to form a thixotropic gel of the total composition.

The following is an example of an organic material which forms a thixotropic gel in an aqueous media.

EXAMPLE 13

| | Parts by Weight |
|---|---|
| Polyvinyl alcohol | 24 |
| Water | 800 |
| $H_2O$ soluble copolymer of methyl vinyl ether and maleic anhydride | 8.5 |

The thixotropic gel was prepared by mixing the PVA in water at room temperature, following which the copolymer of methyl vinyl ether and maleic anhydride is added and vigorously mixed for 5 minutes. This material is a thixotropic gel and forms a uniform coating on fibers drawn therethrough.

The following is an example of another organic material which forms thixotropic gels in aqueous media.

EXAMPLE 14

| | Percent by Weight |
|---|---|
| Polymer of ethylene oxide (MW 1,000,000+) | 10 |
| Condensate tetrethylenepentamine and stearic acid | 0.2 |
| *Kelzan (polysaccharide gum) | 1.0 |
| Union Carbide L-77 (Nonionic organo-silicone surfactant) | 0.01 |
| Water | 88.79 |

*Made by Kelco Company. A polysaccharide gum produced by fermentation of an alginate with xanthomonas comphestris bacterium.

This material is prepared by heating the polyox solution and the polyamine-stearic acid condensate until the later is dissolved. The L-77 is added following which the Kelzan is added and stirred until it is dissolved. This produces a thick creamy emulsion wherein a thixotropic material is dispersed throughout a thixotropic gel formed by the Kelzan and water.

The following is an example of a starch material that has been made into a thixotropic gel.

EXAMPLE 15

| | Parts by Weight |
|---|---|
| Cationic corn starch (CATO 75) | 175 |
| Carbopol (thixotropic agent manufactured by B. F. Goodrich Chemical Co. as per Patent 2,798,053) | 10.5 |
| $NH_4OH$ (28%) | 7.9 |
| L-77 | 0.35 |
| Water | 3500 |

This mixture is prepared by cooking the starch to boiling and then quenching with cold water. Carbopol is dispersed in one liter of water and added to the cooked starch. The L-77 is also diluted with water and then added to the mix. This mixture is stirred thoroughly and then let stand until all of the air is out of the mixture. Thereafter, the ammonia hydroxide is slowly stirred in. The mixture forms a thixotropic gel which forms a very uniform coating on fibers drawn therethrough.

EXAMPLE 16

| | Parts by Weight |
|---|---|
| Water dispersible bentonite clay (Benaqua)* | 10 |
| Micro-crystaline cellulose (Avicel-C) | 5 |
| Water | 485 |

*A highly beneficiated hydrous magnesium montmorillonite having an average chemical analysis of about 53.7 percent $SiO_2$, about 24.5 percent MgO, and about 12 percent loss on ignition.

This material was prepared by preblending the Benagua and Avicel-C powders and then adding this blend to water in a heavy thixotropic gel which will carry other materials, such as starches, etc. with it when applied to glass fibers in the manner given above. Gelling materials can be easily applied to the fibers by the applicators disclosed in application Ser. No. 573,348 filed Aug. 18, 1966, now U.S. Pat. No. 3,498,262.

The following example is examplary of dye containing materials which can be made and applied to fibers without contamination of surrounding fiber making operations, and which will not discolor other fibers with which the dye containing fibers are mixed. These materials can be used as tracer yarn in gun roving for visual indication of fiber distribution in hand lay-up operations.

EXAMPLE 17

| Material | Desirable Wt. Range % | Preferred Weight % |
| --- | --- | --- |
| FILM FORMER | 1 – 30 | |
| Polyvinyl acetate | | 7 |
| GELLING AGENT | 0.2 – 15 | |
| Carbopol 934 (polycarboxylic acid) | | 1.5 |
| DYE | 0.5 – 20 | |
| *Pontamine fast red | | 8.0 |
| CATIONIC LUBRICANT | 0 – 10 | |
| AHCO 185 AE | | 0.252 |
| AHCO 185 AN | | 0.108 |
| NONIONIC LUBRICANT | 0 – 1 | |
| Carbowax 1000 (polyethylene glycol MW 1000) | | 0.300 |
| COUPLING AGENT | 0 – 5.0 | |
| Gamma amino propyl triethoxy silane | | 0.7 |
| AQUA AMMONIA (28%) pH control | | |
| VEHICLE | balance | |
| Water | | balance |

*Pontamine fast red has the formula:

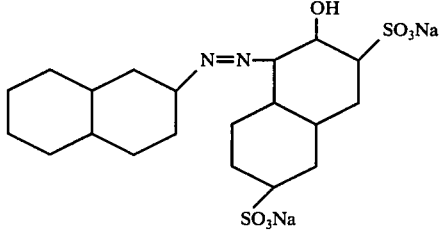

The above composition is made by making a water dispersion of the dye, a water solution of the thixotropic gelling agent, and a water solution of the cationic and nonionic lubricants, and then adding the dye and gelling agent premixes to the dispersion of the cationic and nonionic lubricants. Thirty-five parts of deionized water is added to a mixing kettle followed by the addition of 16.6 parts of the pontamine fast red dye. One part of aqueous ammonia is added and the materials mixed until a smooth dispersion is obtained. In another mixer, 92.9 parts of deionized water and 3.12 parts of the carbopol 934 is added and mixed until homogeneous. Thereafter 0.20 parts of ammonia are added to the gelling agent premix and the dye premix is blended in. In another mixer, 20 parts of deionized water, 0.52 parts of AHCO 185 AE and 2.24 parts of AHCO 185 AN are added and stirred into a solution at 100° F. Thereafter 0.30 parts of ammonia are added to give a smooth dispersion, and it is added to the gel-dye mixture. Thereafter 29.1 parts of polyvinyl acetate is added slowly and completely dissolved, and 0.80 parts of ammonia are added and mixed until a smooth gel is obtained. Thereafter additional ammonia is added to bring the pH to between 6 and 6.5. The material is then applied to glass fibers at forming as above described to give a red colored strand which can be twisted with other strand without dye transfer and which can be used in a gun chopping and spraying operation for glass fiber reinforced polyester resin lay-ups, etc. as a tracer yarn for indicating fiber distribution.

EXAMPLE 18

The following is a gel forming material containing a polyester resin:

| Material | Desirable Wt. Range % | Preferred Weight % |
| --- | --- | --- |
| FILM FORMER | 1–40 | |
| Selectron 5930 (unsaturated water dilutable polyester resin) | | |
| GELLING AGENT | 0.2–15 | |
| Carbopol 934 (Polycarboxlyic acid) | | 1.25 |
| COUPLING AGENT | 0.05–10 | |
| Methacryloxypropyltrimethoxysilane | | 0.05 |
| LUBRICANT | 0–10 | |
| PEG 400 (Polyoxyethylenemonoleate) | | 0.35 |
| EMULSIFYING AGENT | 0–20 | |
| Sulfonated mineral oil | | 0.25 |
| DEIONIZED WATER | Balance | 87.89 |

EXAMPLE 19

The following is another specific example of a polyester gel forming material which is particularly suited for the manufacture of glass fiber reinforced rods, as for example fishing poles:

| Materials | Percent by Weight |
| --- | --- |
| Selectron 5930 | 2.50 |
| Avicel C | 4 |
| Methacryloxypropyltrimethoxysilane | 0.79 |
| Sulfonated mineral oil | 0.25 |
| Water | balance |

Examples 18 and 19 are prepared in substantially the same manner as is the material of Example 17.

The material of Example 19 when applied to glass fibers by the applicator disclosed in application Ser. No. 573,348 provides approximately 1% of solids on the coated fibers. After the fibers are coated with the size, they are drawn together into a strand, which in the present instance comprises 408 fibers, and the strand is coiled into a package, and the package dried. A plurality of these strands is then dipped into an organic solution of the same Selectron 5930 polyester resin having approximately 50% solids. The resin coated strands are then pulled through a die which removes excess resin and shapes the impregnated strands into the form of a rod. The resin forming the rods is then cured, and in the case of Example 19, the rods contain approximately 50% by weight of resin solids. Fifty percent retention of resin in an impregnating process is unusually high, and is believed to occur by reason of the particulate nature of the microcrystalline cellulose (Avicel C) gelling agent which is used in Example 19.

Shear thinning gels can be produced by two types of gelling action or phenomena. One type of gel structure occurs when the molecules of a gelling agent arrange themselves in long, linear chains which hold solvent on the exterior surface of the chains by secondary forces, such as Van der Waal forces, etc. This type of gelling agent produces gels which have been characterized as pseudoplastic, and which gradually change from a condition having the rigidity of a gel into a material having the fluidity of a solution.

Another type of gel structure is produced by a type of gelling agent which forms a cage type structure which holds the solvent internally of the cage. These cage structures attach themselves weakly to other cage structures by means of secondary types of bonds to form gels. When this type of gel is subjected to increasing amounts of shear, a point is reached where the cages are moved past each other fast enough to prevent regrouping, and a sudden drop in viscosity is noted. This sudden drop is sometimes referred to as a breaking of the gel, and as pointed out above, the word thixotropic has recently been more narrowly defined to be specific to this type of gelling mechanism. Thixotropic gelling agents, therefore, in the narrow sense, produce cages or particles which tend to separate the fibers of a strand so that the strand has greater space between the fibers and is capable of holding a greater amount of impregnating material than is the case when pseudoplastic gelling materials are used. Examples of particulate or thixotropic gel producing agents are Baymal, water dispersible bentonite clay (Benaqua), Thixcin R, guar gum and polyacrylamides. These materials, therefore, will have particular advantages when used as a gelling agent in the broad formulations given in Example 18.

Another specific example is as follows:

EXAMPLE 20

| Materials | Percent by Weight |
| --- | --- |
| Selectron 5930 | 2.5 |
| Methocel (50,000 cps) | 0.5 |
| Methacryloxypropyltrimethoxysilane | 0.5 |
| Sulfonated mineral oil | 0.5 |
| Acetic acid | 0.3 |
| Water | balance |

EXAMPLE 21

Gels of rubber producing Latex, either natural or synthetic, can also be made and applied to fibers. Suitable materials can be produced as follows:

| Materials | Desirable Wt. Range % | Preferred Weight % |
| --- | --- | --- |
| ELASTOMERIC LATEX (solids) | 5–50 | |
| Butadiene latex (65% solids) | | 15 |
| Resorcinol formaldehyde latex (40% solids) | | 10 |
| COUPLING AGENT | 0.1–10 | |
| Gammaaminopropyltrimethoxysilane | | 2 |
| GELLING AGENT | 0.2–15 | |
| Avicel C | | 6.0 |
| *Methocel | | |
| SOLVENT | Balance | |
| Water | | Balance |

*Methocel is a cellulose gum of these types:
1) Methylcellulose
2) Hydroxypropylmethylcellulose
3) Hydroxybutylmethylcellulose The gels of the latex are made by dispersing the Avicel in water followed by the addition and dispersion of the methocel. The mixture is then run through an homogeniser to produce a very high bodied gel. The latex is then added with stirring and is thoroughly incorporated. The material when applied to glass fibers at forming using the gel type applicator above described gives a uniform coating of approximately 9 percent solids.

EXAMPLE 22

A nylon coating material which produces a gel is made as follows:

| Material | Desirable Wt. Range % | Preferred Weight % |
| --- | --- | --- |
| NYLON | 1–30 | |
| Nylon 66 | | 12 |
| GELLING AGENT | 0.2–15 | |
| Carbopol 934 | | 0.5 |
| COUPLING AGENT | 0–10 | |
| 3-(trimethoxysilyl)propyl methacrylate | | 0.5 |
| CATIONIC LUBRICANT | 0–10 | 3 |
| SOLVENT FOR NYLON | 0–30 | |
| Tetra ethanol amine | | 0.5 |
| EMULSIFYING AGENT | 0–5.0 | |
| Sulfonated mineral oil | | 0.3 |
| SOLVENT | balance | |
| Water | | balance |

The nylon coating material was prepared by the following procedure. The nylon is dissolved in a suitable solvent, such as tetraethanolamine, phenol, or a lower alcohol such as methanol, or ethanol. The emulsifying agent is added slowly to 1/4 of the water and the nylon solution is then added with violent mixing to form an emulsion. Upon standing, some of the solvent evaporates from the particles of nylon so that they solidify and form a dispersion. In another Eppenbach mixer, the gelling agent is added to one fourth of the water until completely dissolved, and the tetraethanolamine is added. The nylon dispersion is then added to the gelling solution, and the mixer is run at maximum speed until a thick white creamy gel is formed. The coupling agent is then added, and the material is applied to glass fibers at forming as above described.

The 3-(trimethoxysilyl)propyl methacrylate given in the example above is used to provide wash fastness for fabric produced from the coated fibers. It will be understood that a high degree of coupling is not desired in some types of textiles, and that, therefore, a coupling agent is not necessary in all instances. Cationic lubricants are used for providing lubrication for fibers when drawn over numerous guide surfaces in a wetted condition. A cationic lubricant, therefore, is also not necessary in all instances. Similarly solvent for the nylon will not be necessary if the nylon is of low molecular weight.

EXAMPLE 23

Another nylon coating material was formed as follows:

| Material | Desirable Wt. Range | Percent by Weight |
| --- | --- | --- |
| NYLON | 1–30 | |
| Nylon 66 | | 3 |
| NYLON SOLVENT | 0–30 | |
| Isopropanol | | 12 |
| COUPLING AGENT | 0.0–10 | |
| Gamma aminopropyltriethoxysilane | | 2 |
| GELLING AGENT | 0.2–15 | |
| Thixcin R | | 3 |
| SOLVENT | balance | |
| Cellosolve acetate | | balance |

The nylon 66 was dissolved in five times its weight of isopropanol at 100° F. The dissolved nylon was added to the cellosolve acetate at 100° F., and the gamma aminopropyltriethoxysilane was thereafter thoroughly mixed therewith in an Eppenbach mixture. After the materials were thoroughly blended together, the Thixcin R was added, with the mixer running at full speed and with the materials heated to a temperature of 118° F., to form a gel. This material was applied to glass fibers at forming to give a uniform coating on the fibers.

EXAMPLE 24

A gelling rubber stock is made as follows:

| Material | Desirable Wt. Range % | Preferred Weight % |
|---|---|---|
| RUBBER STOCK | 10–50 | |
| Styrene butadiene | | 20 |
| SOLVENT | 50–90 | |
| Toluene | | 80 |
| GELLING AGENT | 0.2–15 | |
| Carbopol 934 | | 3 |

The gel forming material is made by chopping the rubber stock sheet into small pieces approximately ¼ inch square and adding them to 1/2 of the solvent with constant mixing. The gelling agent is dissolved in the other half of the solvent and the rubber solution then mixed therewith. This material is a pseuoplastic gel at room temperature. When the material is applied to glass fibers, as above described, it uniformly coats the fibers and gives an ignition loss of approximately 9.3 percent.

EXAMPLE 25

The following is an example of a tetrafluorhydrocarbon gel forming material which can be applied to the glass fibers:

| Material | Desirable Wt. Range % | Preferred Weight % |
|---|---|---|
| GELLING AGENTS | .2–15 | |
| Carbopol 934 | | 0.50 |
| POLYTETRAFLUOROHYDROCARBON | 1–20 | |
| Polytetrafluoroethylene | | 3 |
| COUPLING AGENT | 0–3 | |
| Gamma methacryloxypropyltrimethoxysilane | | 0.50 |
| EMULSIFYING AGENT | .05–5 | |
| Sulfonated mineral oil | | 0.36 |
| AQUA AMMONIA ADJUST pH 7 to 8 | | |
| SOLVENT FOR THE FLUOROHYDROCARBON | .5–20 | |
| Tetrafluoroethylene monomer | | 2 |
| WATER | | balance |

The polytetrafluoroethylene used is an emulsion polymerized material stabilized with sulfonated mineral oil and containing 60 percent solids and 40 percent water. The Aqua ammonia was mixed with this dispersion with a spatula. The Carbopol 934 was added to the water in an Eppenbach mixer, and the coupling agent added thereto with continued stirring for 10 minutes. The emulsifying agent was then added and stirred until it was incorporated into the solution. Thereafter, the solution of ammonia and fluorohydrocarbon was added slowly into the mixture with extreme agitation until a smooth clear gel forming material was produced. This material is applied to glass fibers at forming as above described and gives a uniform protective coating.

EXAMPLE 26

The following is an example of a gel size for coating glass fibers to be used in producing bonded staple.

| Material | Desirable Wt. Range % | Preferred Wt. Range % |
|---|---|---|
| OXIRANE MODIFIED POLYESTER SOLIDS | 3–20 | |
| Adduct of polyester and epichlorhydrin (90% solids, 10% xylol) | | 13 |
| POLYESTER RESIN SOLIDS | 3–20 | |
| 65% solids in xylol and methyl isobutyl ketone | | 13 |
| LUBRICANT | 0–10 | |
| White mineral oil | | 3.39 |
| GELLING AGENT | 0.2–15 | |
| Thixcin R | | 3 |
| SOLVENT | balance | |
| Cellosolve acetate | | 67.61 |

In those instances wherein the fibers are collected from a veil and twisted into a strand by passing the fibers through an air turbine, more than approximately 1% of a lubricant is needed to withstand the action of the air turbine.

EXAMPLE 27

The following is an example of a size for glass fibers to be used as a thermal plastic or thermosetting resin reinforcement.

| Material | Desirable Wt. Range % | Preferred Wt. Range % |
|---|---|---|
| NONHARDENING PHENOL-EPICHLORHYDRIN ADDUCT SOLUBILIZED WITH AN ALKANOL AMINE AND END STOPPED WITH A POLYGLYCOL | 0.5–10 | |
| *Bisphenol A-epichlorhydrin adduct end stopped with polyethylene oxide monooleate M.W. 400 and diethanolamine in 1:1 ratio | | 1 |
| EMULSIFYING AGENT | 0.5–20 | |
| Polyethylene glycol stearic acid adduct | | 2 |
| ORGANO-SILANE COUPLING AGENT | 0.1–10 | |
| Gamma aminopropyltriethoxysilane | | 0.50 |
| ACID | 0.1–1 | |
| Acetic acid | | 0.25 |
| GELLING AGENT | 0.2–15 | |

| Material | Desirable Wt. Range % | Preferred Wt. Range % |
|---|---|---|
| Methocel (50,000 cps) | | 0.50 |
| DEIONIZED WATER | balance | balance |

*The adduct has the following formula:

HO—C—C\
HO—CC—N—C—C—C—[O—⌬—⌬—O—C—C—C—]₃—O—⌬—⌬—O—C—C—C—O—(R₁—O)ₙ—OR₂ with H, O above certain C atoms.

where $R_1$ is an ethyl group, $OR_2$ is a monooleate radical
n = 400 M.W.

EXAMPLE 28

The following is another example of a gel size for application to glass fibers to be used in reinforcing a thermal plastic or thermosetting resin.

EXAMPLE 29

The following is an example of a thixotropic coating for application to glass fibers for use as a weaver's roving:

| Material | Desirable Wt. Range % | Preferred Wt. Range % |
|---|---|---|
| NONHARDENING END STOPPED PHENOL-EPICHLORHYDRIN ADDUCT SOLUBILIZED WITH AN ALKANOLAMINE AND AN ACID | .5-10 | |
| Bisphenol A-epichlorhydrin adduct end stopped with polyethylene oxide monooleate M.W. 400 and diethanolamine in 1:1 ratio | | 1.0 |
| SATURATED POLYESTER RESIN | 0.1-5 | |
| (1 mol phthalic anhydride, 1 mol succinic anhydride, 2.3 mols propylene glycol cooked to an acid number of 35 - 40) | | 0.5 |
| ALKANOLAMINE ADDUCT OF PHENOL-EPICHLORHYDRIN EPOXY PREPOLYMER | 0.1-3 | |
| **Bisphenol-epichlorhydrin adduct solubilized by diethanolmine and acid | | 0.3 |
| ORGANO-SILANE COUPLING AGENTS | 0.1-10 | |
| Gamma aminopropyltriethoxy-silane | | 0.5 |
| ACID | 0.1-1 | |
| Acetic acid | | 0.3 |
| EMULSIFYING AGENT | 0.5-20 | |
| Polyethylene glycol stearic acid adduct (400 molecular weight) | | 2 |
| GELLING AGENT | 0.2-15 | |
| Methocel | | 0.5 |
| pH ADJUSTMENT | 3.8-5.8 pH | |
| NH₄OH | | 4.83 |
| WATER | balance | balance |

**The adduct has the following formula:

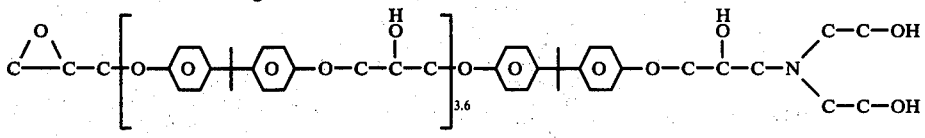

| Material | Desirable Wt. Range % | Preferred Wt. Range % |
|---|---|---|
| NONHARDENING PHENOL-EPICHLORHYDRIN ADDUCT SOLUBILIZED WITH AN ALKANOL AMINE AND END STOPPED WITH A POLYGLYCOL | 0.5-10 | |
| Bisphenol A-epichlorhydrin adduct end stopped with polyethylene oxide monooleate M.W. 400 and diethanolamine in 1:1 ratio | | 1 |
| SOLUBILIZED EPOXY RESIN | 0.1-3 | |
| ***Bisphenol-epichlorhydrin adduct solubilized by diethanolmine and acid | | 0.3 |
| ORGANO-SILANE COUPLING AGENT | 0.3-3 | |
| Gamma methacryloxypropyl-trimethoxysilane | | 0.5 |
| ACID | 0.1-1 | |
| Acetic acid | | 0.3 |
| EMULSIFYING AGENT | 0.5-20 | |

| Material | Desirable Wt. Range % | Preferred Wt. Range % |
| --- | --- | --- |
| Polyethylene glycol stearic acid adduct (400 molecular weight) | | 2 |
| GELLING AGENT | 0.2–15 | |
| Methocel | | 0.50 |
| WATER | balance | balance |

***This material has the formula: same as * above except $OR_2$ is a monostearate radical.

EXAMPLE 30

The following is a size for glass fibers to be used for reinforcing epoxy resin:

| Material | Desirable Wt. Range % | Preferred Wt. Range % |
| --- | --- | --- |
| EPOXY RESIN | 1–40 | |
| Dow DER 337 | | 2.7 |
| NONHARDENING RESIN | 0–10 | |
| Polyester or epoxy | | 0.0 |
| ORGANO SILANE COUPLING AGENT | 0.1–10 | |
| Gamma aminopropyltriethoxysilane | | 0.4 |
| SILICONE LUBRICANT | 0.1–1 | |
| Dimethyl polysiloxane | | .15 |
| EMULSIFYING AGENT | 0.01–10 | |
| Isooctyl phenyl polyethoxy ethanol | | 0.15 |
| GELLING AGENT | 0.2–15.0 | |
| Polyacrylamide crosslinked with epoxy | | 0.30 |
| WATER | balance | balance |

EXAMPLE 31

The following is an example of an acrylic gel size for staple:

| Material | Desirable Wt. Range % | Preferred Wt. Range % |
| --- | --- | --- |
| ACRYLIC POLYMER | 2–20 | |
| Acrylic polymer | | 7 |
| CATIONIC LUBRICANT | 0–10 | |
| Condensate of tetraethylenepentamine and stearic acid | | 0.28 |
| GELLING AGENT | 0.2–15 | |
| Thixcin R | | 4.0 |
| SOLVENT | balance | |
| Cellusolve acetate | | balance |

EXAMPLE 32

The following is an example of an epoxy resin gel size for coating fibers used to reinforce epoxy resins:

| Material | Desirable Wt. Range % | Preferred Wt. Range % |
| --- | --- | --- |
| EPOXY RESIN | 0.5–40 | |
| Epoxy resin of Example 28 | | 1.0 |
| NONHARDENING EPOXY OR POLYESTER FILM FORMER | 0–10 | |
| End stopped epoxy of Example 27 | | 0.8 |
| GELLING AGENT | 2–15 | 0.5 |
| COUPLING AGENT | 0.1–10 | |
| Gamma glycidoxy propyltrimethoxy silane | | 0.5 |
| LUBRICANT | 0–10 | 0.5 |
| SOLVENT | balance | balance |

The following is an example of the formulation of an epoxy resin dispersion in an aqueous gel.

EXAMPLE 33

| Material | Desirable Wt. Range | Preferred Wt. Range |
| --- | --- | --- |
| EPOXY RESIN | 1–40% | |
| Dow Chemical DER337 | | 2.72% |
| SOLVENT FOR THE EPOXY RESIN | 0–15% | |
| Diacetone alcohol | | 2.5% |
| EMULSIFYING AGENT | 0.04–2.5% | |
| Nonylphenoxypoly (ethyleneoxy) ethanol | | 0.12% |
| GELLING AGENT | 0.2–15% | |
| Methocel 50,000 cps | | 0.5% |
| Methocel 15 cps | | 0.1% |
| COUPLING AGENT | 0.1–10% | |
| Gamma glycidoxy propyltrimethoxysilane | | 0.4% |
| ACID | 0.1–1% | |
| Acetic acid | | 0.02% |
| WATER | balance | balance |

EXAMPLE 34

The following is an example of a gel size of an organosilane coupling agent generally devoid of a film former. The composition forms a thin coating over which a polymer can later be applied as occurs during filament winding of tanks, pipes and pressure vessels.

| Materials | Desirable Wt. Range % | Preferred Wt. % |
| --- | --- | --- |
| Gelling Agent | 0.2 – 2.0 | |
| Crosslinked polyacrylamide (Gelgard M of Dow Chemical Co.) | | 0.3 |
| Organosilane Coupling Agent | 0.1 – 2.0 | |
| Gamma amino propyl tiethoxysilane | | 0.7 |
| Siloxane Coupling Agent & Lubricant | 0 – 2.0 | |
| Dimethyl polysiloxane | | 0.15 |
| Siloxane terpolymer of a trimethyl silane, methyl, phenyl silane and a methyl ethylene oxide silane | | 0.15 |
| Emulsifying Agent | 0 – 2.5 | |
| Isooctyl phenyl polyethoxy ethanol | | 0.15 |
| Water | Balance | Balance |

In the above example, the emulsifying agent is used to disperse the siloxane lubricant.

It will be seen that useful gelling sizes for coating glass fibers can be made from any film former in generally the following proportions:

| Material | Range in weight percent |
| --- | --- |
| Film former | 1–50 |
| Coupling agent | 0–10 |
| Gelling agent | 0.2–15 |
| Lubricant | 0–10 |
| Solvent | balance |

For coating materials which are to be tightly bonded to the glass fibers, at least 0.01 percent of a glass coupling agent such as an organosilane is needed. Where the coated fibers are to be run through textile forming machinery, at least 0.1 percent of a nonionic lubricant is needed. Where the fibers are flexed against each other in a wetted condition to any extent at least 0.01 percent of a cationic lubricant is also necessary.

Carbopol, methocel and cross linked polyacrylamide may be considered as pseudoplastic gelling agents. As previously indicated pseudoplastic gelling agents produce gels which do not have a sudden break in viscosity during the transition from the gelatinous state to the solution state. The pseudoplastic gelling agents are believed to link up into long chains or lattices whose external surfaces hold the solvent by means of secondary bonds or forces.

Thixcin R, microcrystalline cellulose, Benaqua and Baymal are examples of true thixotropic gelling agents which, as previously indicated, produce gels which have a sharp reduction in viscosity at the breaking of the gel during transition from the gelatinous state to the solution state. In all the examples given above, the preferred compositions were either nonflowable gels through which the fibers are drawn, or are thin flowable gels through which the fibers are drawn. The flowable gels exhibit the reversible shear thinning properties necessary for the practice of the invention, but do not have sufficient gelling agent to hold all of the solvent in a nonflowable, or rigid state. In those examples given above, wherein the solvent is water, and the gelling agent is methocel in a concentration below approximately 2 percent, the gel formed is a reversible shear thinning flowable gel that is pourable, and which sets up into a firm gel in the package during the evaporation of water. The examples given above wherein the solvent is water and the gelling agents is Carbopol, in a concentration of approximately 0.2 percent, are also flowable gels which set up more firmly in the package upon the evaporation of water. When Carbopol is used in water at a concentration of approximately ½ percent and the mixture is neutralized with a base such as ammonia, the material sets up into a rigid pseudoplastic gel. This same result is achieved using 5 percent Carbopol in water without neutralization.

In the examples given above containing an organic solvent, the Carbopol in a concentration of approximately less than 0.5 percent, flowable nonrigid gels are produced. In those instances where the solvent is a volatile solvent such as toluene etc., evaporation takes place at the surface to form a skin of thickened gel. This skin thickening action starts to take place a short distance away from the applicator before reaching the package.

In an organic system using Carbopol, and a low concentration of for example approximately 0.5 percent, it is possible to subject glass fibers coated therewith to the neutralizing action of ammonia to form a rigid gel prior to being wound into the package.

In those examples using Thixin R as gelling agent, it is also possible to apply the composition to the fibers at a temperature of above approximately 120° F. wherein the compositions are liquid and immediately thereafter cool the fibers to convert the coating to a gel prior to being wound into the package.

It would be understood, however, that the preferred procedure is to draw the fibers through a material that is a nonflowable gel, either of the pseudoplastic or of the thixotropic type, in order that the fullest advantages of the shear thinning gelatinous state is obtained. This gives the largest concentration of solids on the fibers, the minimum loss of material to the surrounding area, the minimum migration, and the greatest transfer efficiency. The use of the truly thixotropic gelling agents are the most preferred materials, because of the sharp drop in viscosity which gels made therefrom exhibit, and because the sharp drop in viscosity facilitates the flow of the material around the fibers during application.

While the invention has been described in considerable detail, we do not wish to be limited to the specific embodiments described, and it is our intention to cover hereby all novel adaptations, modifications, and arrangements thereof which will occur to those skilled in the art to which the invention relates.

We claim:

1. A composition consisting essentially of a polyvinyl acetate resin, an organosilane coupling agent, a gelling agent comprising cellulose, a lubricant comprising a polyethylene glycol and an inorganic liquid solvent for said polyvinyl acetate resin, said composition being a reversible, shear-thinning gel.

2. The composition of claim 1 in which said polyvinyl acetate resin is employed in an amount within the range of from 1 to about 50 weight percent of said composition.

3. The composition of claim 1 in which said organosilane coupling agent is selected from the group consisting of gamma-aminopropyltriethoxysilane, methacryloxypropyltrimethoxysilane, glycidoxytrimethoxysilane, gamma-aminopropyltrimethoxysilane and gamma-glycidoxypropyltrimethoxysilane.

4. The composition of claim 1 in which said organosilane coupling agent is employed in an amount within the range of from 0.01 to 10 weight percent of said composition.

5. The composition of claim 1 in which said gelling agent is employed in an amount within the range of from 0.2 to 15 weight percent of said composition.

6. The composition of claim 1 in which said lubricant is employed in an amount within the range of from 0.01 to 10 weight percent of said composition.

7. The composition of claim 1 consisting essentially of, in weight percent of said composition, said polyvinyl acetate resin in an amount of 7 percent, said organosilane coupling agent in an amount of 0.7 percent, said gelling agent in an amount of 1.5 percent and said lubricant in an amount of 0.3 percent.

* * * * *